(12) United States Patent
Dunahoo et al.

(10) Patent No.: US 9,545,684 B2
(45) Date of Patent: Jan. 17, 2017

(54) SYSTEM AND METHOD FOR AUTOMATED CONTROL OF WELDING SYSTEMS INCLUDING A SPOOL GUN

(71) Applicants: Jason Dunahoo, Appleton, WI (US); Seth Michael Gregory, Kaukauna, WI (US); Craig Steven Knoener, Appleton, WI (US)

(72) Inventors: Jason Dunahoo, Appleton, WI (US); Seth Michael Gregory, Kaukauna, WI (US); Craig Steven Knoener, Appleton, WI (US)

(73) Assignee: ILLINOIS TOOLS WORKS INC., Glenview, IL (US)

( * ) Notice: Subject to any disclaimer, the term of this patent is extended or adjusted under 35 U.S.C. 154(b) by 81 days.

(21) Appl. No.: 13/886,596

(22) Filed: May 3, 2013

(65) Prior Publication Data

US 2014/0326706 A1  Nov. 6, 2014

(51) Int. Cl.
| | | |
|---|---|---|
| *B23K 9/133* | (2006.01) | |
| *B23K 9/10* | (2006.01) | |
| *B23K 9/12* | (2006.01) | |
| *B23K 9/173* | (2006.01) | |
| *B23K 9/32* | (2006.01) | |

(52) U.S. Cl.
CPC .......... *B23K 9/1336* (2013.01); *B23K 9/1043* (2013.01); *B23K 9/124* (2013.01); *B23K 9/133* (2013.01); *B23K 9/173* (2013.01); *B23K 9/32* (2013.01)

(58) Field of Classification Search
CPC ..... B23K 9/133; B23K 9/1333; B23K 9/1336; B23K 9/173
USPC ............... 219/130.1, 132, 137.2, 137.31, 137.7, 219/137.71
See application file for complete search history.

(56) References Cited

U.S. PATENT DOCUMENTS

| | | | |
|---|---|---|---|
| 5,777,295 A | 7/1998 | Kneisley et al. | |
| 5,864,117 A | 1/1999 | Kneisley et al. | |
| 6,103,994 A | 8/2000 | DeCoster et al. | |
| 6,570,132 B1 | 5/2003 | Brunner et al. | |
| 6,855,914 B1* | 2/2005 | Kaufman et al. | ........ 219/137.71 |
| 7,329,834 B2 | 2/2008 | Kaufman et al. | |
| 7,381,925 B2 | 6/2008 | DeCoster et al. | |
| 7,999,209 B2 | 8/2011 | Diekmann et al. | |
| 8,288,686 B2 | 10/2012 | Kaufman | |
| 2006/0169685 A1 | 8/2006 | Stanzel | |
| 2007/0158313 A1* | 7/2007 | Stanzel ................. | B23K 9/323 219/74 |
| 2010/0314370 A1* | 12/2010 | Granato et al. ............ | 219/130.1 |

FOREIGN PATENT DOCUMENTS

| | | |
|---|---|---|
| CN | 102639275 A | 8/2012 |
| CN | 202607053 | 12/2012 |
| WO | 2012135479 A1 | 10/2012 |

* cited by examiner

*Primary Examiner* — Brian Jennison
(74) *Attorney, Agent, or Firm* — Quarles & Brady, LLP (57) ABSTRACT

A system and method for automatic detection of a connection of a spool gun to a welding system. In addition to automatically detecting connection of the spool gun, a system and method is provided for controlling the operation of the welding system based on the detection of the spool gun.

22 Claims, 5 Drawing Sheets

SYSTEM AND METHOD FOR AUTOMATED CONTROL OF WELDING SYSTEMS INCLUDING A SPOOL GUN

CROSS-REFERENCE TO RELATED APPLICATIONS

N/A

BACKGROUND OF THE INVENTION

The field of the invention is welding systems. More particularly, the invention relates to the automatic detection of and control following detection of a spool gun in a welding system.

Welding is the process of joining two or more metal parts by bringing metals into a molten state in which they flow together to create a welded joint. Some welding processes employ a wire feeder connected to a welding power source and a welding gun. Typically, the wire feeder controls a main spool of consumable electrode in the form of a welding wire and is configured to deliver the wire to the welding gun through a cable connection. The welding gun provides a tip that exposes the welding wire, such that during a welding process the wire feeder initiates a high electric current that is transmitted through the welding wire to the exposed end at the tip of the gun. The electric current generates an electric arc extending from the tip of the gun to a welding surface. The heat produced by the electric arc melts the exposed welding wire onto the welding surface to create the welded joint. In a gas metal arc welding (GMAW) system and/or a flux cored arc welding (FCAW) system, a shielding gas provided by the wire feeder through the cable connection is also delivered at the tip of the welding gun to protect the welding process.

In many cases, the wire feeder employs a variety of welding guns, including a standard welding gun ("standard gun") and a spool welding gun ("spool gun"). The standard gun receives a continuous feed of welding wire from the wire feeder, which utilizes a primary internal motor to feed the wire from the main spool located at the wire feeder through the cable connection to the gun tip. On the other hand, the spool gun incorporates a spool of consumable electrode wire and a motor or drive assembly in the gun itself, such that the continuous feed of welding wire during the welding process is provided directly by the spool gun rather than by the wire feeder. Since there is no need to feed the consumable wire from the wire feeder, the internal motor of the wire feeder is disengaged during employment of the spool gun.

To control this process, the wire feeder or other system provides a toggle switch for users to manually select whether a standard gun or a spool gun is attached to the wire feeder. Thus, user input ensures proper operation of the wire feeder and spool gun to avoid poor weld performance and/or damaged machinery. For instance, if a standard gun is attached to the wire feeder, but the toggle switch is set to the spool gun, then the wire feeder fails to deliver welding wire to the standard gun since the internal motor of the wire feeder would be disengaged for that setting. If a spool gun is attached to the wire feeder, but the toggle switch is set to the standard gun, then the wire-feeder motor delivers welding wire from the main spool despite the spool gun being attached. Since the spool gun is not configured to receive the wire feed, the welding wire may bind and collect at the spool gun, within the cable connection between the spool gun and the wire feeder, and/or at the wire feeder itself.

Therefore, it would be desirable to have a system and method that further facilitates proper operation of the wire feeder and standard or spool gun beyond relying on user input and proper operation of user interfaces.

SUMMARY OF THE INVENTION

The present invention overcomes the aforementioned drawbacks by providing a system and method for automatic detection of a connection of a spool gun to a welding system without the need for specialized hardware or gun connection systems. In addition to automatically detecting connection of the spool gun, a system and method is provided for controlling the operation of the welding system based on the detection of the spool gun.

In one embodiment, a method is disclosed for automatically detecting a presence of a spool gun within a welding system including a wire feeder. The method includes detecting a current along an electrical connection that could include one of a spool gun and a non-spool gun coupled to the welding system through a common output terminal of the wire feeder. The method further includes the step of determining that the current along the electrical connection that could include one of the spool gun and the non-spool gun is indicative of an operational connection of the spool gun to the welding system through the common output terminal of the wire feeder. Upon determining that the current is indicative of the operational connection of the spool gun to the welding system, the method includes the step of disengaging a motor of the wire feeder.

In another embodiment, a wire feeder is configured to provide a consumable wire to drive a welding process. The wire feeder comprises a housing, a spool support configured to support the consumable wire mounted on the spool support during the welding process, and an internal motor disposed within the housing. The internal motor is configured to remove the consumable wire from the spool and deliver the consumable wire during the welding process. The wire feeder further comprises a power connections unit that is configured to receive an input power from a power source and deliver an output power to drive the welding process through an output terminal configured to be connected to both the spool gun and the non-spool gun welding resources. Even further, the wire feeder comprises a controller that is configured to automatically detect an operative connection of a spool gun through the output terminal to receive the output power and configured to disengage the internal motor upon automatically detecting the operative connection of the spool gun through the output terminal.

In yet another embodiment, a method is provided for automatically detecting a connection of a spool gun to a welding system to drive a welding process. The method comprises the steps of providing a non-welding power to a welding resource that may include a spool gun for use during a welding process and providing a welding power to the welding resource that may include a spool gun to effectuate the welding process. The method further includes the step of monitoring a power connection at least providing access to the non-welding power, using a controller of the welding system, to determine consumption of the non-welding power from the power connection. Upon determining the power consumption, the method includes the step of automatically determining that the welding resource is a spool gun.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
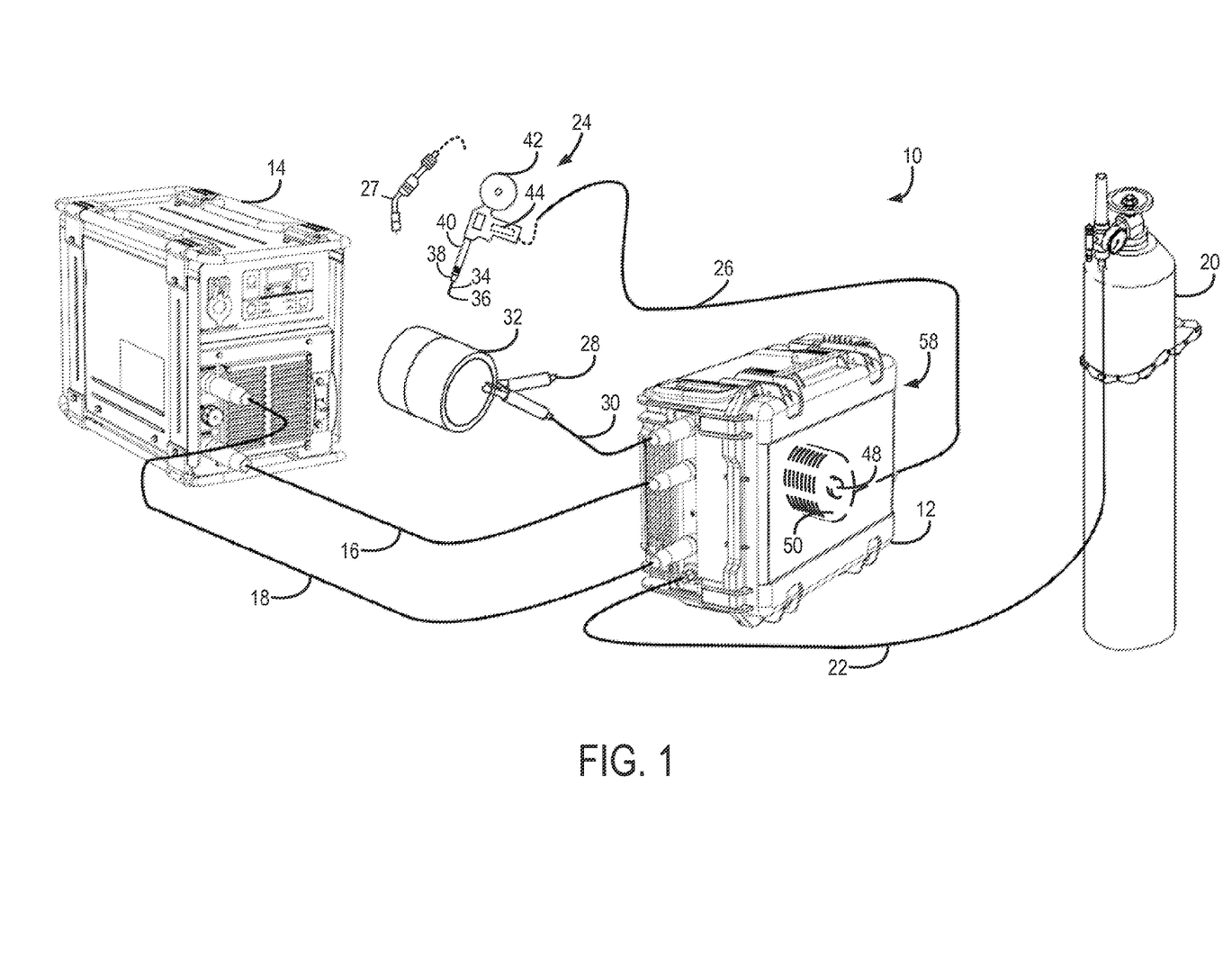
FIG. 1 is a perspective view of a welding system in accordance with the present invention.

The present invention includes a system and method for automatically detecting a spool gun connected to a welding system and controlling operation of the welding system using the automatic detection. Referring to FIG. 1, a welding system 10 includes a wire feeder 12 connected to a power source 14 by two power input cables 16, 18 and to a gas source 20 by a gas cable 22. In the illustrated, non-limiting, example, the wire feeder 12 may be portable. Additionally, though illustrated as being separate, the wire feeder 12 and power source 14 may be integrated into a common housing.

In the illustrated welding system 10, a spool gun 24 is connected to the wire feeder 12 through a cable 26. As illustrated and will be explained, the welding system 10 may also be connected to other welding guns or torches 27 that are not spool guns through cable 26. In this regard, the guns or torches 24, 27 may be referred to collectively as welding resources. To complete the welding circuit, a clamp 28 and a clamp cable 30 are provided. The clamp 28 is configured to be secured to a portion of a work piece 32 during a welding process. As will be explained, the cables 16, 18, 26 may be traditional cables and connected through standard cable connections to the wire feeder 12, power source 14, and welding gun/torch 24, 27. That is, as will be described, the present invention provides a system and method for detecting the presence or absence of the spool gun 26 connected to the welding system 10 without the need for specialized hardware or gun connection systems.

In the illustrated, non-limiting, example, the welding system 10 may be configured to perform a GMAW or FCAW welding process that utilizes a consumable wire 34 carrying a high electrical current that is provided by the power source 14 through the wire feeder 12 and a shielding gas provided by the gas source 20 through the gas cable 22. The wire feeder 12 may include a spool support 48 on which a spool of wire 50 is mounted. As illustrated, the spool support 48 may be located within a housing 58 of the wire feeder 12 and, thus, the spool of wire 50 is likewise located within the housing 58. In other, non-illustrated configurations, the spool support 48 and, thereby, the spool of wire 50 may be mounted externally from the housing 58.

The wire feeder 12 is designed to pull wire from the spool of wire 48 to be driven as a consumable electrode to the weld. That is, assuming that the spool gun 24 were not connected to the cable 26 and, instead, the welding gun or torch 27 that does not include a separate spool of wire is connected to the cable 26, the wire feeder 12 would drive wire from the spool of wire 50 down the cable 26 to be delivered to the weld location on the work piece 32.

However, with the spool gun 24 operationally connected to the cable 26, during operation, wire is to be driven from a spool of wire 42 located at the spool gun 24 rather than from the spool of wire 50 driven by the wire feeder 12. That is, during operation of the welding system 10 with the spool gun 24 operationally engaged, a wire tip 36 of consumable wire 34 is delivered from the spool of wire 42 located at the spool gun 24 through an opening of a nozzle 38 on a barrel 40 of the spool gun 24.

In particular, the consumable wire 34 is stored as a pre-coiled reel of wire that is secured within the spool 42 located on the spool gun 24. Internal to the welding gun 24 is a drive assembly 44 that is designed to continuously feed the consumable wire 34 to the welding site where an electric arc is generated by the high electrical current in the wire 34. The arc extends from the wire tip 36 to the work piece 32 such that heat from the current melts the consumable wire 34 to assist in effectuating the weld. To drive this process, the cable 26 is configured to carry the weld current without driving wire from the spool 50 at the wire feeder 12 to the spool gun 24.

As noted above, the various components shown in FIG. 1 may be rearranged or substituted without compromising embodiments of the present disclosure, as understood by one skilled in the art. As described above, the spool gun 24 may be replaced with a different welding resource such as a welding gun or torch 27 that does not include a spool of wire. The welding resource may also provide the cable 26 as a permanent fixture such that the cable 26 and the welding resource are a single assembly that is received at a connection point on the wire feeder 12. Additionally, the gas cable 22 provides a conduit for a flow of shielding gas delivered from the gas source 20 and ultimately to the work piece 32 to protect the welding site from air contaminants. Thus, the gas source 20 may be replaced with a smaller, travel-sized gas cylinder housed within the wire feeder 12 and the clamp 28 may represent any other securing mechanisms.

Figure 2A:
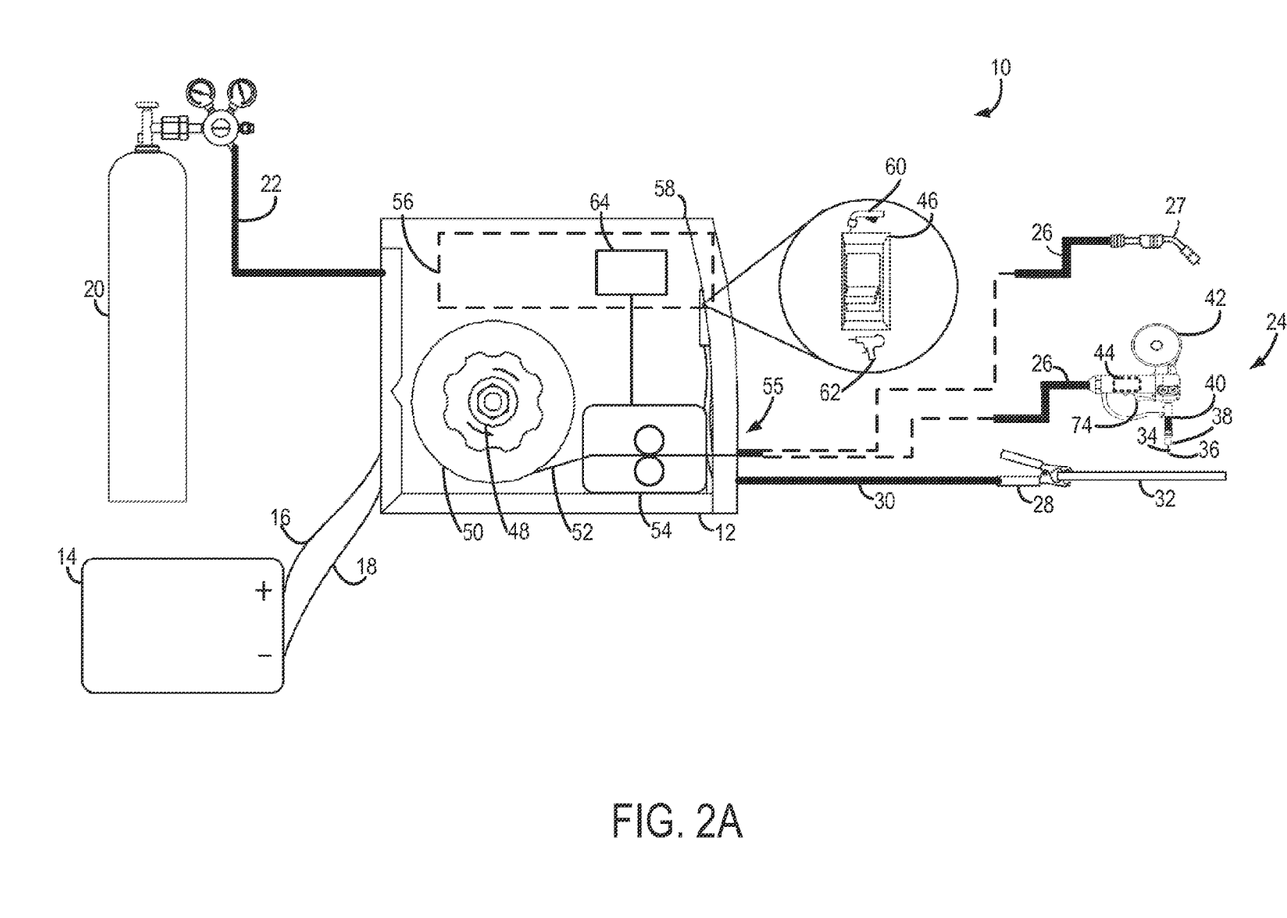
FIG. 2A is a schematic view of a welding system having a spool gun and a wire feeder in accordance with the present invention.

Turning now to FIG. 2A, a schematic view of one configuration for the welding system 10 is shown having the spool gun 24 attached to the wire feeder 12. As will be described, the illustrated wire feeder 12 includes a toggle switch 46 that, in accordance with the present invention, may be forgone, overridden, or repurposed in certain configurations. A cross-sectional view of the wire feeder 12 shows interior components including a spool support 48 configured to secure a spool of consumable wire 50, hereon referred to as a consumable electrode 52. The consumable electrode 52 is fed through a drive motor 54 that is designed to remove the consumable electrode 52 from the spool support 48 and deliver the consumable electrode 52 to drive the welding process. The drive motor 54 may be powered from the input power supplied by the power source 14 through the power input cables 16, 18. Again, the cables 16, 18 may be traditional cables and connected through standard cable connections to the wire feeder 12, and other variations such as a wire feeder 12 provided with an internal power source 14 and/or gas source 20 may be implemented.

The input power may be used by the wire feeder 12 to power the drive motor 54, provide the high electric welding current carried in the consumable electrode 52, and support functions of various other components, processors and controllers in the wire feeder 12. Typically, an output terminal 55 of the wire feeder 12 is formed as a receptacle to receive a pinned connector that is attached at the opposite end of the cable 26 to the welding gun 24. For example, some systems may provide the output terminal 55 with a four-pin connector, a ten-pin connector, a fourteen-pin connector, and/or a power/gas pin connector. As will be described, the present invention is designed to distinguish between torches or guns connected to the welding system, even when the different torches or guns are connected through the same pinned connector. That is, as illustrated, the spool gun 24 and welding gun or torch 27 are configured to be connected through the cable 26 to the output terminal 55. In this regard, the same pin configurations or pinned connector may be present regardless of the particular welding gun or torch 24, 27 that is connected. As will be described, the present invention provides systems and methods for automatically determining which gun or torch is connected without the need for user input, such as through the toggle switch 46 or specialized hardware or dedicated communication lines that differentiate or identify the gun or torch 24, 27 that is connected.

In some embodiments, a power connections unit 56 may be provided to receive the input power from the power source 14 and control distribution as described. The drive motor 54, the spool support 48, the spool of wire 50, and the power connections unit 56 may be contained within a housing 58 that is configured to protect the inner components from weather, water, and unwanted exposure to other elements.

Still referring to FIG. 2A, the wire feeder 12 may optionally include the toggle switch 46 disposed on an outer surface of the housing 58. The toggle switch 46 provides a manual input means for a user to select between a standard gun setting 60 and a spool gun setting 62. As shown in FIG. 2A, the toggle switch 46 is pressed down and selected for the spool gun setting 62, since the spool gun 24 is attached to the wire feeder 12 for operation. As described in FIG. 1, the spool gun 24 includes the spool 42 that supplies the consumable wire 34. As such, the spool gun setting 60 prevents the additional delivery of the consumable electrode 52 from the spool support 48 inside the wire feeder 12. For instance, the spool gun setting 60 may deactivate or disengage the internal drive motor 54 so that no consumable electrode 52 is fed from the wire feeder 12. However, as will be described, the systems and methods of the present invention can distinguish and identify the presence of the spool gun 24 without the inclusion of or despite the user indication provided through the toggle switch 46 or other use interface.

A controller 64, which may include a circuit board or other processor, may be utilized to disengage, deactivate, re-engage, and/or reactivate the internal drive motor 54, as well as control other parameters of the motor 54, such as gearbox operating parameters including speed, consumable electrode 52 feed tension such as for a standard welding gun connection, and the like. As will be described in further detail, the controller 64 may be configured to automatically detect the presence of the spool gun 24 as being operationally connected to the cable 26 and therethrough to the wire feeder 12, without specialized hardware, such as specialized pin connections or dedicated communications cables or connections. In this regard, the user interface 46 is, as described, optional.

As described previously, the spool gun 24 provides the welding consumable wire 34 which extends from the nozzle 38 of the spool gun 24 to effectuate the welding process. As such, the motor 54 of FIG. 2A is in a disengaged or deactivated state such that the consumable electrode 52 is not fed to the spool gun 24. Therefore, with the spool gun 24 attached, it is contemplated that the cable 26 delivers only the high welding current, shielding gas from the gas source 20, and trigger and motor 54 control signals.

At the spool gun 24, the tip 36 of the consumable wire 34 is positioned proximate to the work piece 32 and the electric current passes through the consumable wire 34 to the work piece 32 causing the wire 34 to be heated, melted, and fused with the work piece 32. Since the electrical energy supplied by the power source 14 is typically greater than that required to melt the consumable wire 34, the area on the work piece 32 surrounding the weld also melts, which yields an improved bonding between the melted consumable wire 34 and the work piece 32.

Figure 2B:
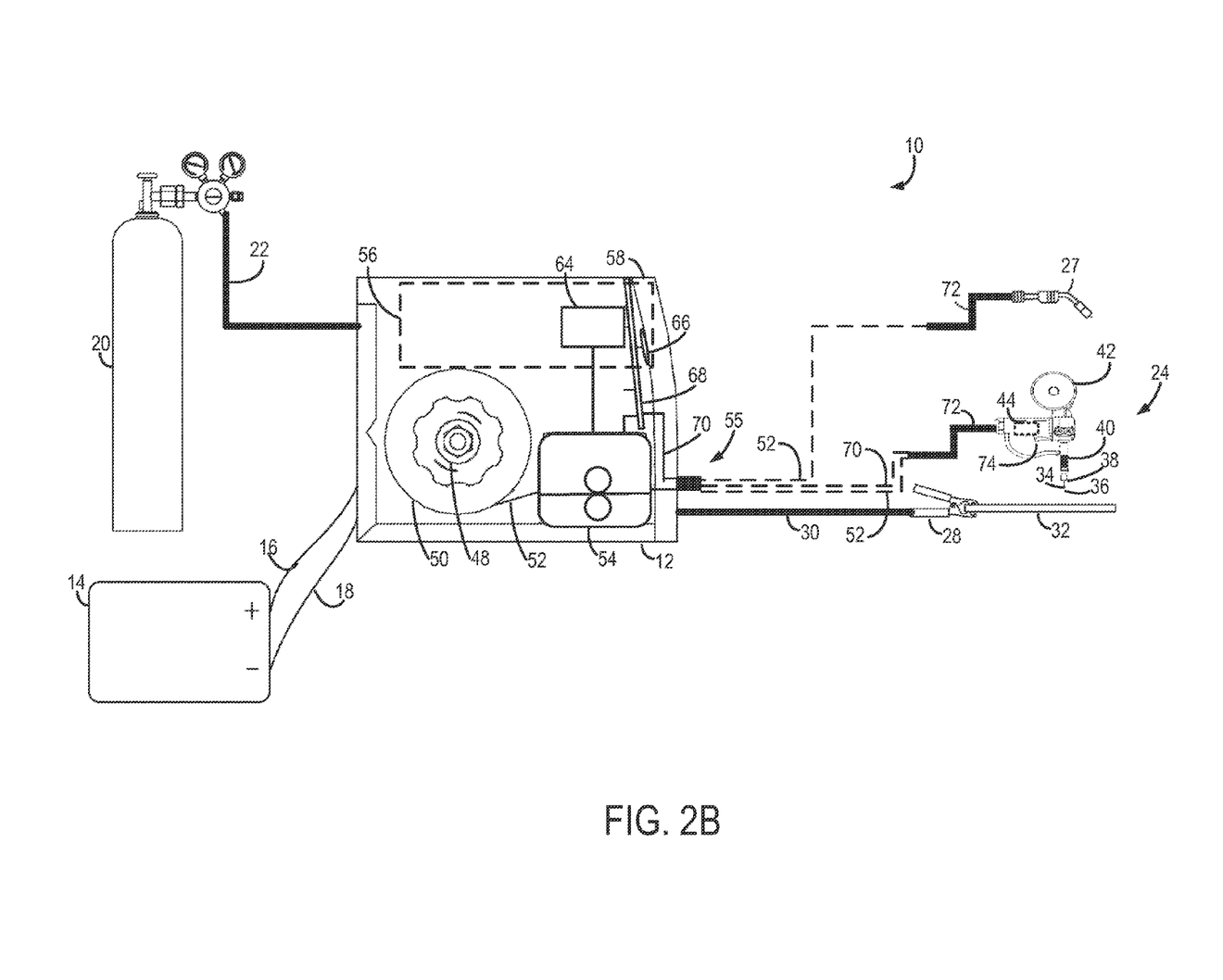
FIG. 2B is a schematic view of another welding system having a spool gun in accordance with the present invention.

In reference to FIG. 2B, schematic view of another configuration for the welding system 10 is shown having the spool gun 24 attached to the wire feeder 12. As described above, the toggle switch 46 need not be provided in the welding system 10. In addition to this design variation, it is contemplated that an indicator 66 may be provided to notify the user that a spool gun configuration has been detected by the wire feeder 12. The indicator 66 may utilize an LED or other lighting or mechanism, such as a display that symbolically or textually informs the user of the automatic detection of the present configuration.

Also, in the configuration illustrated in FIG. 2B, a second, non-welding power connection 70 may be included in a cable 72, or may be incorporated into a separate cable. This second power connection 70 is configured to drive electronics in the spool gun 24 or other guns or torches connected to the wire feeder 12. Thus, no specialized or dedicated connections are provided between the wire feeder 12 and spool gun 14 that are designed specifically to identify the presence of the spool gun or facilitate communications between the spool gun 24 and wire feeder 12. In fact, as illustrated, the second power connection 70 may be made through the output terminal 55 of the wire feeder 12 and using the same interface or pin connections as used to connect to other torches or guns 27 that may or may not utilize the second power connection.

As illustrated, the second power connection may provide a direct current ("DC") power from, for example, a DC rail 68 of the wire feeder 12. The DC rail 68 provides a low voltage, DC power through the low-voltage, DC connection 72 that is connected to the spool gun 24. The low-voltage DC power may include a voltage of, for example, less than a volt or two and less than fifty volts. Additionally, the low-voltage DC power may have a voltage of less than a volt to about 15 volts. Furthers still, some systems may utilize 1.5 volts, 1.8 volts, or 3.3 volts. Such voltage ranges are used to drive many electronics systems. However, the second, non-welding power connection 70 can also carry other power types, such as alternating current (AC) power and powers having different current and voltage characteristics.

As shown in FIG. 2B, the second, non-welding power connection 70 may be coupled with the consumable electrode 52 in a multi-conductor cable 72 that includes both a path for delivering welding power and the above-described non-welding power. In this regard, the multi-conductor cable 72 is a variation of the cable 26 of FIG. 2A that is attached to the spool gun 24. In some embodiments, the second, non-welding connection 70 may be arranged in a separate or dedicated connection, for example, separate from the cable 26 of FIG. 2A.

In accordance with one configuration that will be further described below, when the spool gun 24 is connected, a current in the second, non-welding power connection 70 from the wire feeder 12 to the spool gun 24 is detected. On the other hand, in the absence of the spool gun 24, including when a standard gun 27, for example, one that does not include the drive assembly 44, the electrical circuit is open and current does not flow. In this regard, a current through the second, non-welding power connection 70 can be used to determine the presence or absence of the spool gun 24.

Regardless of the particular configurations described above or variations therefrom, the present invention provides systems and methods for automatically determining the presence or absence of a spool gun within a welding system without the need for specialized or dedicated connections or communications links. Based on such determinations, control of the welding system, such as by using operational parameters designed for use with or without a spool gun, whichever the case may be, may also be implemented automatically.

Figure 3:
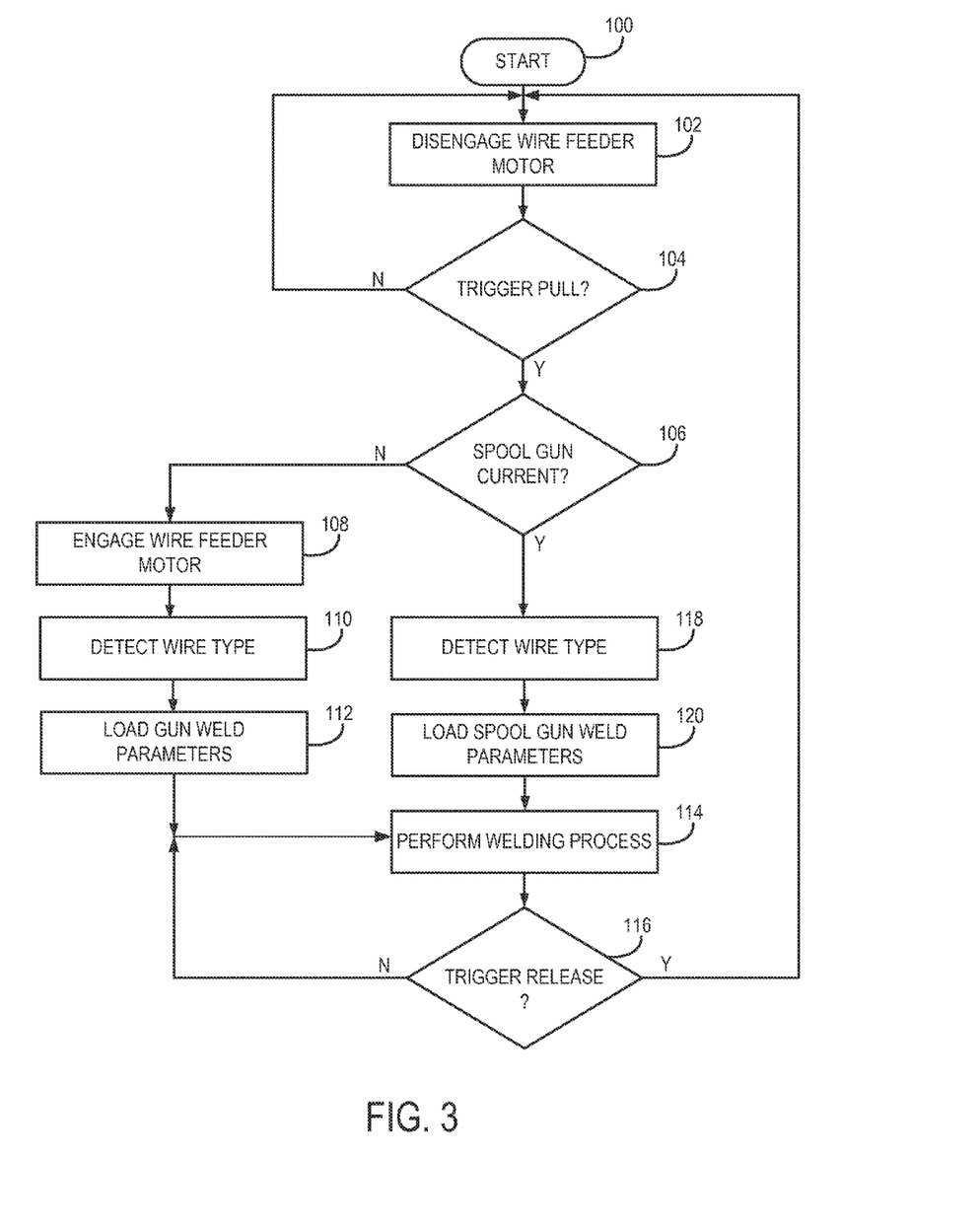
FIG. 3 is a flowchart setting forth the steps of a method for automatic spool gun detection in accordance with the present invention.

Referring to FIG. 3, a flowchart of a method for automatic spool gun detection is provided. The method begins at a start block 100, in which the wire feeder 12, such as illustrated in FIGS. 1-2B, is operatively connected to a plurality of components, which may or may not include the spool gun 24. The wire feeder 12 may be turned on or otherwise set to an operational or standby state in which it is readily capable of performing a welding process.

At block 102, the wire feeder is configured to disengage the wire feeder motor in preparation for entering decision block 104 where the wire feeder receives a signal or other indication that a trigger of a welding torch or gun has been pulled. If no such indication is received, the wire feeder continues to maintain disengagement of the wire feeder motor at process block 102 and monitor for a trigger pull indication at decision block 104. Upon receiving feedback indicating that a trigger has been pulled at decision block 106, the wire feeder monitors the welding cable to determine whether there is a current in the welding cable despite the wire feeder having disengaged or delayed operation of the motors within the wire feeder that are configured to drive the consumable electrode to the welding torch.

If no current is detected, the process continues to block 108 to engage the wire feeder motor. It is contemplated that no current detected is indicative of a non-spool gun attachment, such that the wire feeder motor is activated to feed the consumable electrode from the wire feeder. The wire feeder may continue to detect the type of consumable electrode or wire type at block 110, and based on the determination at block 110, continue to process block 112 whereby the controller loads gun weld parameters that correspond to the wire type or other welding parameters. As such, the process proceeds to block 114 to perform the welding process with the weld parameters implemented, and further to continue monitoring, at block 116, whether a trigger release is detected. As long as a trigger release is not detected, the welding process at block 114 continues. On the other hand, if a trigger release is detected at decision block 116, then the process loops back to disengage the wire feeder motor at block 102 and look for an indication of another trigger pull at decision block 104.

If current is detected while the motor(s) are disengaged, the wire feeder can determine, at process block 106, that a spool gun has been coupled with the welding system. This is because if the welding gun or torch were not a spool gun that includes its own spool of wire and a drive system and, thereby, a mechanism by which to drive wire to the weld, a current indicative of a welding process would not have been detected because the non-spool gun would not have been provided with a supply of the consumable electrode due to the fact that the motor(s) at the wire feeder were disengaged or delayed from operating. In this regard, the present systems and method are capable of determining the presence or absence of a spool gun connected to the welding system without specialized or dedicated connections or communications links, including specialized connection pin configurations and the like.

In response to determining that the spool gun is attached, the controller continues to process block 118 where it detects a wire type and then loads a set of spool gun weld parameters at block 120 for operating the wire feeder and/or power source during performance of the welding process at block 114. Such parameters may include, but are not limited to, maintaining the internal drive motor in a deactivated state throughout the welding process or while the trigger remains pulled, or other operations that prevent the consumable electrode from being delivered to the spool gun during the welding process. Other exemplary parameters may include power characteristics that are advantageous for or were previously set for use with a spool gun. Further, upon the controller determining the type of consumable wire at block 118, wire-type welding parameters may be loaded and implemented during the welding process. During performance of the welding process at block 114, the controller may be configured to continue the welding process at process block 114 until a trigger release is detected at block 116. If no trigger release is detected, the method continues to implement block 114 to perform the welding process. If a trigger release is detected, the process returns to block 102 to disengage the wire feeder motor and monitor for a trigger pull at block 104.

Figure 4:
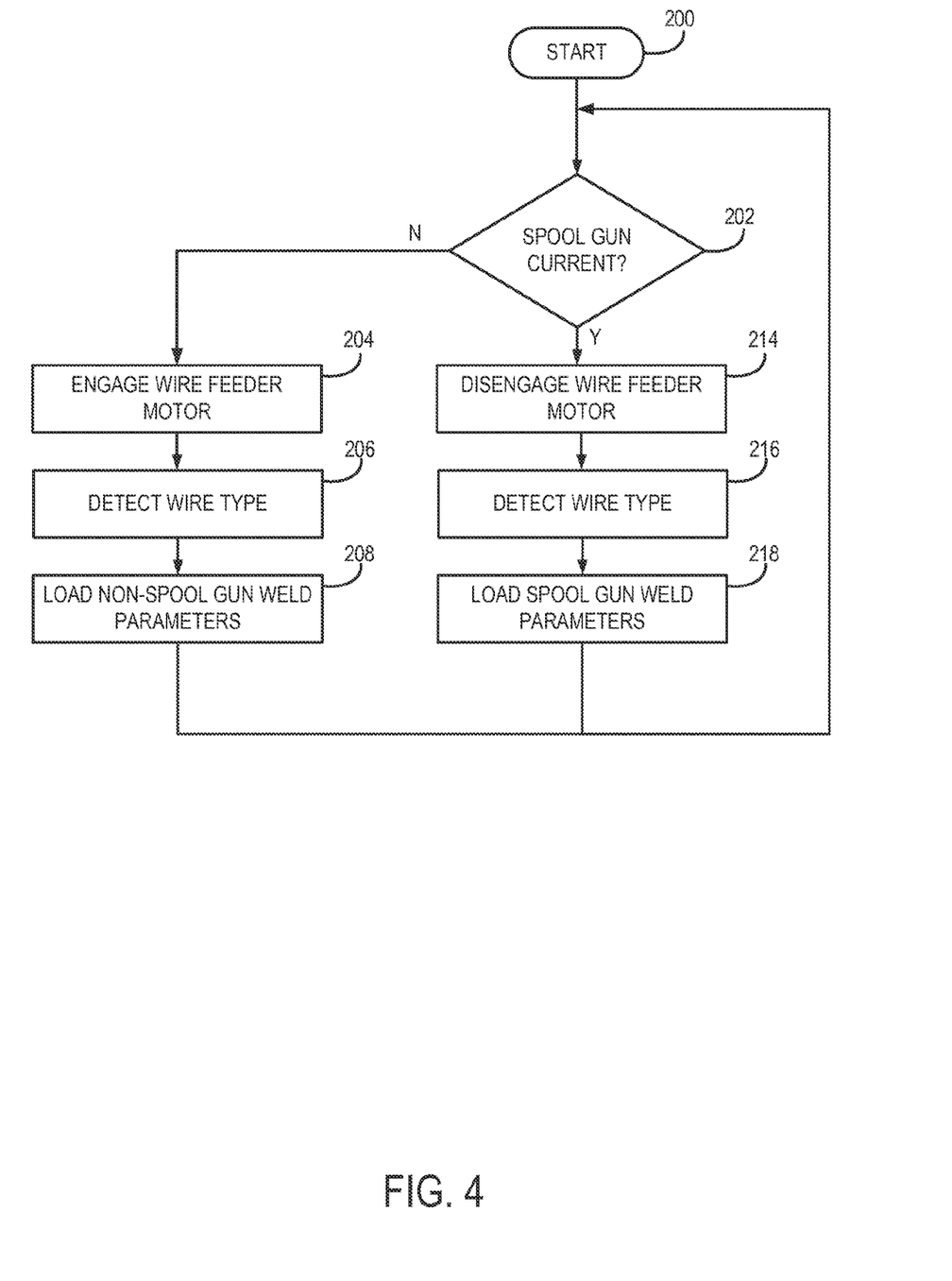
FIG. 4 is a flowchart setting forth steps of another method for automatic spool gun detection in accordance with the present invention.

Referring now to FIG. 4, a flowchart of another technique for automatic spool gun detection is provided. As will be described, the technique described with respect to FIG. 4 is particularly advantageous, for example, when using a welding system that includes a second, non-welding power connection between the wire feeder and welding torch or gun, such as described above with respect to FIG. 2B. The technique begins at block 200 where the wire feeder is configured in an operational state and ready to perform the welding process. At block 202, the controller monitors a second, non-welding power connection to detect for an open circuit condition and therefore determine if a spool gun current is detected. For instance, the second power connection may be the connection described with respect to FIG. 2B that carries the non-welding power to the spool gun. If the controller detects an open circuit whereby no current is detected, then the method continues to engage the wire feeder motor at block 204 and detect for a wire type 206, such as the type of consumable electrode provided on the spool of wire within the wire feeder. As such, it is contemplated that the open circuit condition exists when a standard (non-spool) gun is connected to the wire feeder. The method proceeds to block 208 whereby a set of non-spool gun weld parameters are loaded by the controller. The process then loops back, where the system monitor for the presence of a spool gun current.

On the other hand, if the circuit is not open and a spool gun current is detected, the controller determines at block 202 that the spool gun is connected to the wire feeder. In this regard, the present systems and methods are capable of determining the presence or absence of a spool gun connected to the welding system without specialized or dedicated connections or communications links, including specialized connection pin configurations and the like.

Upon determining the presence of the spool gun, the controller continues to block 214 to disengage the internal drive motor of the wire feeder and to detect, at block 216, the type of consumable wire provided by the spool gun. At block 218, the appropriate spool gun welding parameters are loaded based on the type of wire that is detected and/or a type of spool gun attached. The welding parameters may be implemented by the controller for performance of a welding process. As described, the process loops back to block 202 where the system monitors for the presence of a spool gun current.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for automatically detecting a presence of a spool gun within a welding system including a wire feeder, the method comprising the step of:
    detecting an operational current along an electrical connection coupled to the welding system through a common output terminal of the wire feeder;
    determining that the operational current along the electrical connection is indicative drive assembly of the spool gun connected to the welding system through the common output terminal of the wire feeder; and
    upon determining that the operational current is indicative of the drive assembly of the spool gun connected to the welding system, disengaging a motor of the wire feeder.

2. The method of claim 1, wherein the electrical connection is a non-welding power connection.

3. The method of claim 2, wherein the non-welding power connection is configured to provide a direct current (DC) power including a voltage of less than 50 volts.

4. The method of claim 3, wherein the DC power includes a voltage of greater than 1.5 volts.

5. The method of claim 3, wherein the DC power is provided by a DC rail of the welding system.

6. The method of claim 1, wherein the electrical connection is a welding power connection.

7. The method of claim 1, wherein the steps of detecting and determining include detecting a current to the spool gun in response to a trigger pull at the spool gun.

8. The method of claim 1, wherein disengaging the motor of the wire feeder includes maintaining disengagement of the wire feeder motor despite detecting a current to the spool gun in response to a trigger pull at the spool gun.

9. The method of claim 1, further comprising the step of selecting and implementing welding parameters for the welding process based on at least one of the steps of detecting and determining.

10. The method of claim 9, wherein the step of selecting and implementing includes determining a property of a consumable wire of the spool gun.

11. The method of claim 1, further comprising the step of engaging the drive assembly of the spool motor into a power-on state to detect a current from the wire feeder to the spool gun.

12. A wire feeder configured to provide a consumable wire to drive a welding process, comprising:
    a housing;
    a spool support configured to support the consumable wire mounted on the spool support during the welding process;
    an internal motor disposed within the housing, the internal motor configured to remove the consumable wire from the spool and deliver the consumable wire during the welding process;
    a power connections unit configured to receive an input power from a power source and deliver an output power to drive the welding process through an output terminal; and
    a controller configured to automatically detect a current indicative of drive assembly of a spool gun through the output terminal to receive the output power and configured to disengage the internal motor upon automatically detecting the current indicative of the drive assembly of the spool gun through the output terminal.

13. The wire feeder of claim 12, further comprising a non-welding power connection configured to provide a non-welding power to the welding resource through the output terminal.

14. The wire feeder of claim 13, wherein the controller is further configured to detect a consumption of the non-welding power to automatically detect an operative connection of the spool gun.

15. The wire feeder of claim 13, wherein the non-welding power connection is configured to deliver DC power having a voltage of less than 50 volts.

16. The wire feeder of claim 12, wherein the controller is further configured to automatically detect the presence of the spool gun in response to determining a trigger pull signal from the spool gun.

17. The wire feeder of claim 12, wherein the controller is further configured to control operation of the welding process using spool-gun welding parameters upon automatically detecting the operative connection of the spool gun.

18. The wire feeder of claim 12, wherein the controller is further configured to determine a property of a consumable wire provided by the spool gun.

19. The wire feeder of claim 18, wherein the controller is further configured to determine a welding parameter based on the property of the consumable wire and control the operation of the welding process using the welding parameter.

20. A method for automatically detecting a connection of a spool gun to a welding system to drive a welding process, the method comprising:
    providing a non-welding power to a welding resource;
    providing a welding power to the welding resource;
    monitoring a power connection at least providing access to the non-welding power, using a controller of the welding system, to determine consumption of the non-welding power indicative of a connection of a drive assembly of the welding resource from the power connection; and
    upon determining consumption of the non-welding power indicative of the connection of the drive assembly of the welding resource, automatically determining that the welding resource is a spool gun.

21. The method of claim 20 further comprising, in response to determining that the welding resource is the spool gun, loading, using the controller of the welding system, a set of spool gun welding parameters for use when performing the welding process.

22. The method of claim 20 further comprising, in response to determining that the welding resource is the spool gun, preventing the wire feeder from delivering a consumable wire to the spool gun.

* * * * *